United States Patent
Ivanchenko et al.

(10) Patent No.: US 9,129,400 B1
(45) Date of Patent: Sep. 8, 2015

(54) MOVEMENT PREDICTION FOR IMAGE CAPTURE

(75) Inventors: Volodymyr V. Ivanchenko, Mountain View, CA (US); Gunnar Hovden, Los Gatos, CA (US)

(73) Assignee: Amazon Technologies, Inc., Reno, NV (US)

(*) Notice: Subject to any disclaimer, the term of this patent is extended or adjusted under 35 U.S.C. 154(b) by 569 days.

(21) Appl. No.: 13/243,487

(22) Filed: Sep. 23, 2011

(51) Int. Cl.
*G06K 9/00* (2006.01)
*G06T 7/20* (2006.01)

(52) U.S. Cl.
CPC .............. *G06T 7/2053* (2013.01); *G06T 7/2006* (2013.01); *G06T 2207/20144* (2013.01)

(58) Field of Classification Search
CPC . H04N 5/2226; H04N 5/23219; G06T 7/2053
USPC ........................................................ 348/169
See application file for complete search history.

(56) References Cited

U.S. PATENT DOCUMENTS

| | | | | |
|---|---|---|---|---|
| 7,932,925 B2* | 4/2011 | Inbar et al. | ................. | 348/208.2 |
| 8,483,436 B2* | 7/2013 | Lee et al. | ..................... | 382/103 |
| 2006/0066744 A1* | 3/2006 | Stavely et al. | ................ | 348/352 |
| 2007/0290886 A1* | 12/2007 | Stam et al. | .................... | 340/907 |
| 2008/0166115 A1* | 7/2008 | Sachs et al. | ..................... | 396/55 |
| 2008/0300055 A1* | 12/2008 | Lutnick et al. | ................. | 463/39 |
| 2009/0228841 A1* | 9/2009 | Hildreth | ........................ | 715/863 |
| 2009/0237508 A1* | 9/2009 | Arpa et al. | ..................... | 348/153 |
| 2009/0294666 A1* | 12/2009 | Hargel | ............................ | 250/330 |
| 2010/0142758 A1* | 6/2010 | Pinhas et al. | .................. | 382/103 |
| 2010/0295946 A1* | 11/2010 | Reed et al. | ..................... | 348/164 |
| 2011/0037866 A1* | 2/2011 | Iwamoto | .................... | 348/222.1 |
| 2011/0052083 A1* | 3/2011 | Rekimoto | ...................... | 382/218 |
| 2011/0150284 A1* | 6/2011 | Son et al. | ....................... | 382/103 |
| 2012/0033896 A1* | 2/2012 | Barrows | ........................ | 382/295 |
| 2012/0105657 A1* | 5/2012 | Yokohata et al. | .......... | 348/208.4 |
| 2012/0314914 A1* | 12/2012 | Karakotsios et al. | ......... | 382/118 |
| 2013/0004016 A1* | 1/2013 | Karakotsios et al. | ......... | 382/103 |
| 2013/0016102 A1* | 1/2013 | Look et al. | ...................... | 345/426 |
| 2013/0016877 A1* | 1/2013 | Feris et al. | ..................... | 382/103 |
| 2013/0058537 A1* | 3/2013 | Chertok et al. | ............... | 382/106 |
| 2013/0156278 A1* | 6/2013 | Kim et al. | ...................... | 382/118 |
| 2013/0330003 A1* | 12/2013 | Ivanchenko et al. | .......... | 382/176 |

* cited by examiner

*Primary Examiner* — Christopher S Kelley
*Assistant Examiner* — Deirdre Beasley
(74) *Attorney, Agent, or Firm* — Novak Druce Connolly Bove + Quigg LLP

(57) ABSTRACT

A camera of a computing device can capture two or more images of a region including an object of interest, in order to allow for separation of the object from a background of the images through a process such as image subtraction. In order to compensate for rotations of the device between image captures, an element such as an electronic gyroscope can be used to monitor changes in orientation and predict an amount of shift of objects between images. The predicted shift can be used to attempt to align images captured around the time of the rotation, in order to enable subtraction or similar processes by effectively removing the shifting effect of the rotation.

21 Claims, 6 Drawing Sheets

MOVEMENT PREDICTION FOR IMAGE CAPTURE

BACKGROUND

People are increasingly interacting with computers and other electronic devices in new and interesting ways. For example, various applications enable a user to take a picture of a product or item using a computing device and upload that picture to a service capable of identifying the product or item for the user. Other applications enable a user to provide input to a device through various motions, such as by making a simple hand gesture with respect to a device. Image recognition can be difficult to implement on consumer devices, however, particularly for mobile or portable computing devices that generally have relatively simple camera elements and limited processing capacity. In certain approaches, the amount of image processing can be reduced by separating foreground objects from an image background. In at least some approaches, this separating involves taking at least two pictures and subtracting out portions that do not change. If an object in the foreground moves between pictures, or is highlighted in one picture due to a flash, then that object will not appear substantially the same in both pictures, and thus can be identified relatively easily as the non-changing background will be substantially removed through the subtraction process.

Image subtraction approaches, however, generally rely on the fact that the background and other objects in a viewable range of a camera remain relatively static between the taking of consecutive pictures. If the background moves relative to the computing device, such as due to a movement of the computing device, portions of the background may not appear at substantially the same location in each of the subsequent pictures. Accordingly, the subtraction process may not adequately separate any foreground objects from the background. The process might then result in artifacts, false positives, or inconclusive determinations, or might at least require significantly more processing power to attempt to identify objects in the foreground of the pictures.

BRIEF DESCRIPTION OF THE DRAWINGS

Various embodiments in accordance with the present disclosure will be described with reference to the drawings, in which.

DETAILED DESCRIPTION

Figure 1:
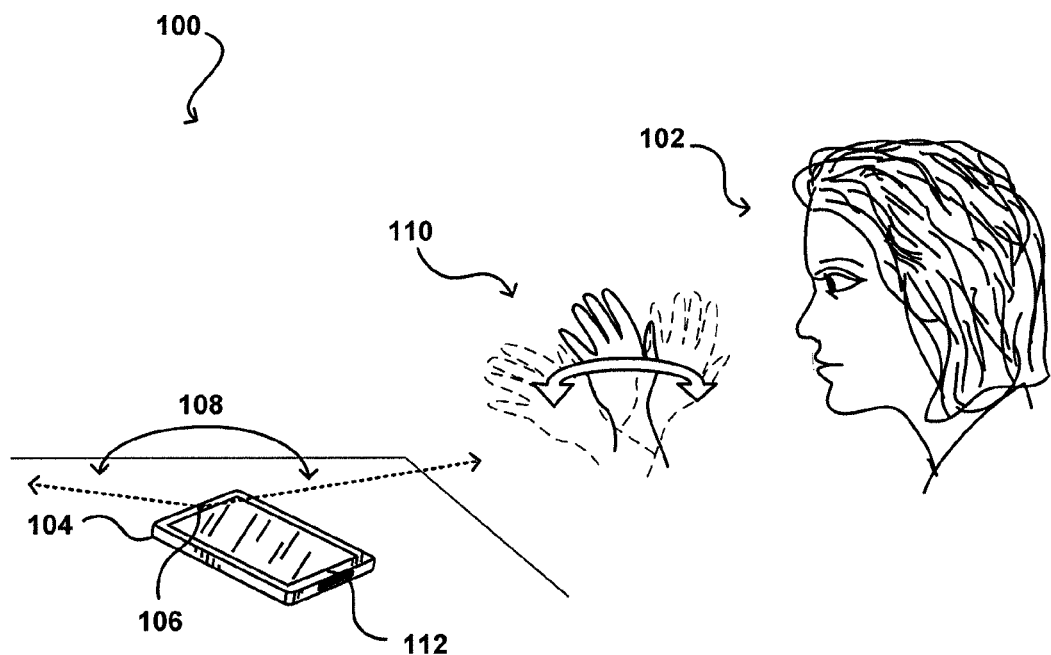
FIG. 1 an example situation wherein a computing device is configured to capture and analyze information about an object in the foreground in accordance with various embodiments.

Systems and methods in accordance with various embodiments of the present disclosure may overcome one or more of the aforementioned and other deficiencies experienced in conventional approaches to capturing image information using an electronic device. In particular, various embodiments utilize at least one motion- or orientation-determining component, or other such embedded sensor, to determine and/or predict motion between the capture of two or more images by an electronic device, in order to account for differences in locations of captured objects between images as a result of the motion. By determining the differences in locations, objects or sections of the images can be aligned, such that image subtraction or another such process can be used to remove portions of the images that are substantially unchanged but for the movement. Such an approach can be used to separate backgrounds or other relatively static objects from the images, such that moving objects and/or objects in the foreground can be easily separated for purposes such as image analysis.

Movement of a computing device can result in ego-motion, which generally refers to the motion of a camera relative to a static scene. Since background objects are often much further away than foreground objects, the change in image position of a background object will generally be very small (and relatively slow) as a result of a device translation, whether laterally (e.g., right to left), in depth (e.g., forward or back), or a combination of both. For purposes of image comparison, such translations can largely be ignored in many situations. Ego-motion in the form of a rotation, however, can be much faster and can significantly affect the image position of an object. For example, a user with a jittery hand (i.e., a user out in the cold) might cause enough rotational movement between image captures that there is a significant amount of movement of objects in the image. Because rotations result in changes in viewing angle that are the same for foreground and background objects, all objects captured in consecutive images can move with the same speed, or by the same distance, as a result of pure rotation. This type of optical flow that is independent of distance can result in difficulty in separating foreground and background objects in the image information. Further, the fast motion can result in a blurring of both foreground and background objects in the captured image information.

In at least some embodiments, a portable computing device will include at least one motion-determining object, such as an accelerometer or electronic gyroscope. An electronic gyroscope, for example, provides information indicating a speed of rotation that can be used to determine and/or track device rotation over time. By determining an approximate amount of device rotation between images, any position shifting between the images can be accounted for in order to align the images for analysis. As discussed, all objects in the foreground and background move together upon a device rotation. By knowing the angular capture range of the camera or other imaging element capturing the images, a calculation can be performed to determine an amount of lateral translation necessary to account for a determined amount of angular rotation of the computing device. For example, if the camera has an angular capture range of 60 degrees and the device rotates 30 degrees between captures, then the rotation is half of the angular capture range and the translation corresponds to half of the lateral width of the resulting images. By shifting at least one of the images by a corresponding amount, objects in the images can be aligned for purposes of image comparison, subtraction, or another such process.

Various lighting and capture approaches can also be used in accordance with various embodiments. For example, ambient light or infrared imaging can be used to capture image information for use in determining the location of various features relative to the device. In some embodiments, a combination of ambient and infrared imaging can be used to assist in removing background objects from the captured image information in order to simplify, and improve the accuracy of, image processing. The information can be captured using any appropriate sensor or detector, such as a digital camera or infrared detector. Further, two or more imaging elements can be used together in at least some embodiments to provide position information in three dimensions.

Various other applications, processes and uses are presented below with respect to the various embodiments.

As mentioned, there can be many situations wherein a computing device is configured to capture and analyze images to attempt to determine information about one or more objects within an image capture range of the device. For example, FIG. 1 illustrates a situation 100 wherein a user 102 would like to provide gesture- and/or motion-based input to a computing device 104, such as to scroll through information in a Web browser, flip to the next page in an electronic book ("e-book"), or perform another such action. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, notebook computers, personal data assistants, cellular phones, video gaming consoles or controllers, and portable media players, among others. In this example, the computing device 104 has at least one image capture element 106 (e.g., at least one camera) operable to perform functions such as image and/or video capture. Each image capture element may be, for example, a camera, a charge-coupled device (CCD), a motion detection sensor, or an infrared sensor, or can utilize another appropriate image capturing technology.

In this example, the user 102 is performing a selected motion or gesture using the user's hand 110. The motion can be one of a set of motions or gestures recognized by the device to correspond to a particular input or action, or can be a specific motion or gesture associated with that particular user. If the motion is performed within a viewable area or angular range 108 of at least one of the imaging elements 106 on the device, the device can capture image information including at least a portion of the motion or gesture, analyze the image information using at least one image analysis, feature recognition, or other such algorithm, and determine movement of at least one feature of the user between subsequent frames or portions of the image information. This can be performed using any process known or used for determining motion, such as locating "unique" features in one or more initial images and then tracking the locations of those features in subsequent images, whereby the movement of those features can be compared against a set of movements corresponding to the set of motions or gestures, etc. Other approaches for determining motion- or gesture-based input can be found, for example, in co-pending U.S. patent application Ser. No. 12/332,049, filed Dec. 10, 2008, and entitled "Movement Recognition and Input Mechanism," which is hereby incorporated herein by reference.

In the example of FIG. 1, the computing device 104 is positioned on a table and thus is relatively stationary. When capturing image information, at least a substantial portion of the background will not move in many situations, such that the background can be relatively easily removed from multiple images by comparing the static portions of those images. If, however, the computing device 104 was in the hand of the user 102, or was being held by another user or positioned on a moveable object, for example, the computing device 104 might be subject to movement during image capture, which can result in objects being in different locations in the captured images.

Figure 2:
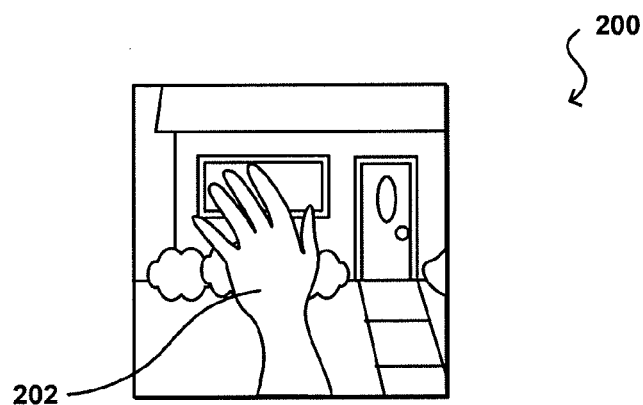
FIG. 2 illustrates an example image showing objects in the foreground and background that can be analyzed in accordance with various embodiments.

FIG. 2 illustrates an example image 200 that can be captured by a camera of a computing device using ambient light for illumination. In this example, a hand of a user is being used to perform a motion or gesture to be interpreted as input by the computing device. As illustrated in the figure, however, there are various other objects in the background of the image. As discussed, it can be difficult, or at least processor- or time-intensive, to attempt to algorithmically identify and/or separate the user's hand 202 from the other portions or objects of the image. For example, an image analysis algorithm would not only have to differentiate the hand from the door, bushes, and sidewalk in the image, but would also have to identify the hand as a human hand, regardless of the hand's orientation. Such an approach can require shape or contour matching, for example, which can still be relatively processor intensive. A less processor-intensive approach would be to separate the hand from the background before analysis.

Figure 3A:
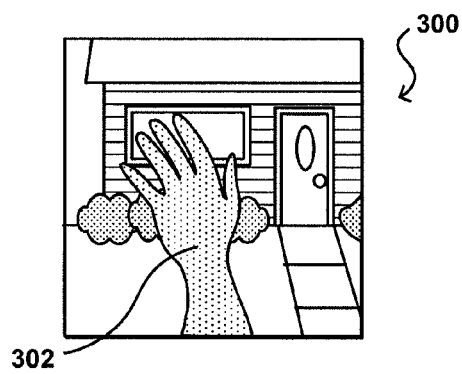
FIGS. 3(a), (b), (c), (d), and (e) illustrate a examples of images that can be used and/or generated using an image comparison or subtraction process in accordance with various embodiments.
Figure 3B:
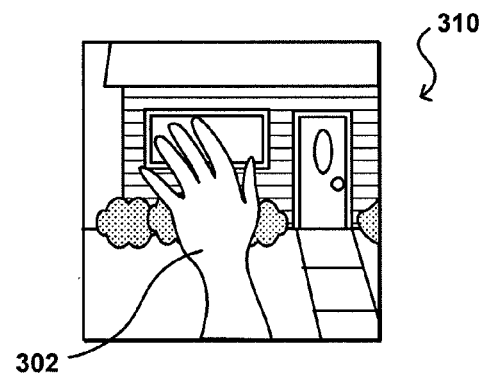

In at least some embodiments, a light emitting diode (LED) or other source of illumination can be triggered to produce illumination over a short period of time in which an image capture element is going to be capturing image information. With a sufficiently fast capture or shutter speed, for example, the LED can illuminate a feature relatively close to the device much more than other elements further away, such that a background portion of the image can be substantially dark (or otherwise, depending on the implementation). For example, FIG. 3(a) illustrates a first example image 300 captured using ambient light and FIG. 3(b) illustrates a second example image 310 captured while an LED or other source of illumination is activated (e.g., flashed or strobed) during (or immediately prior to) a time of image capture. As can be seen, the user's hand 302 changes in appearance between the two images due at least in part to the proximity of the user's hand to the illumination element of the device. As illustrated in FIG. 3(b), the user's hand appears significantly brighter in the second image 310. Objects in the background might not change significantly as a result of the illumination, depending upon shutter speed, illumination methods, and other such factors.

Figure 3C:
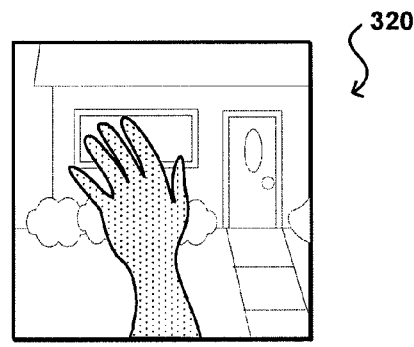

Since the background portions of the images do not substantially change between images, those sections can be at least partially removed from the images by performing a comparison of the two images. For example, FIG. 3(c) illustrates an example image 320 that can be generated by performing a subtraction of the color and/or intensity values of the pixel locations of the first image 300 and the color and/or intensity values of the pixel locations of the second image 310. Such an image comparison can separate out the hand in the generated example image 320, as the illumination projected from the device at the time of capture of the second image can cause the hand to substantially change color and intensity values in the second image (e.g., appear white). The hand then appears prominently in the resulting image due to the large differences in color and intensity values between the two images. Since there is no motion and very little intensity or color change of the background portion of the images, performing a pixel-by-pixel value subtraction (or other such comparison approach) result in the background portions having a very low color value and/or intensity. In some embodiments, the color values might be near zero, resulting in a near black or white background in at least some situations. Due to variations, auto focus, slight movements, and other such factors, there still might be at least some of the background portion visible in the image 320 resulting from the comparison. As should be understood, the result of a comparison process does not have to involve the creation of a separate image in at least some embodiments.

As illustrated in FIG. 3(c), however, the changes in the color, intensity, brightness, and/or other such values of objects near to the device, such as the user's hand in this example, cause those objects to appear more prominently in the resulting image 320. For example, a user's hand might go from a flesh color to an almost white color, having substantially different color values (e.g., R, G, B), such that subtracting the color values for corresponding pixels between the two images will result in substantially non-zero color values in the image resulting from the subtraction. Although subtraction is mentioned by way of example, various other image comparison processes and algorithms can be used as well within the scope of the various embodiments, which can take advantage of the separation of foreground and background objects through image comparison.

Figure 3D:
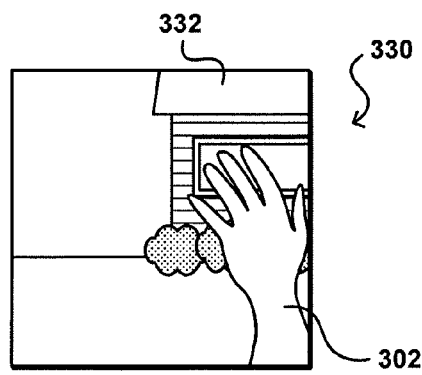
Figure 3E:
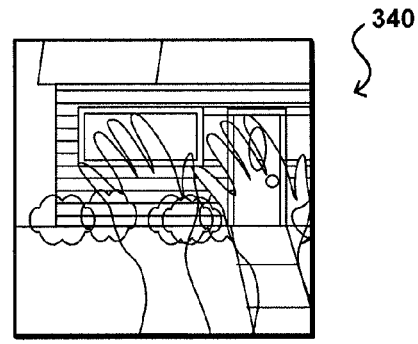

As mentioned above, however, such processes typically rely on the fact that objects in the background will remain relatively stationary with respect to the camera of the computing device between image captures. Consider the situation, however, where a user unintentionally rotates the device between image captures, such as may be due to the user walking, shivering, riding in a vehicle, or experiencing another such motion. FIG. 3(d) illustrates an example of an image 330 captured after a rotation of the computing device (e.g., a rotation of the device about an axis running up and down through the device—such a rotation often referred to as a yaw motion). As can be seen, relative to FIG. 3(a), the user's hand 302 has changed position as a result of the rotation of the computing device. As also can be seen, however, the objects in the background, such as the house 332, have changed position as well. This change in position can negatively impact the subtraction or comparison process because corresponding pixels of the compared images may not correspond to the same object or portion of the same object. FIG. 3(e) illustrates an example of a resultant image 340 when combining the first image 300 and the image 330 captured after device rotation. As illustrated in the resulting image 330, the subtraction has not significantly removed the background, as the objects in the background are no longer aligned in the images. In fact, the resulting image now might be more difficult to analyze and/or attempt to recognize objects in the foreground. Thus, it can be desirable to implement an approach to counteracting, or at least accounting for, the motion of the device between image captures.

Figure 4A:
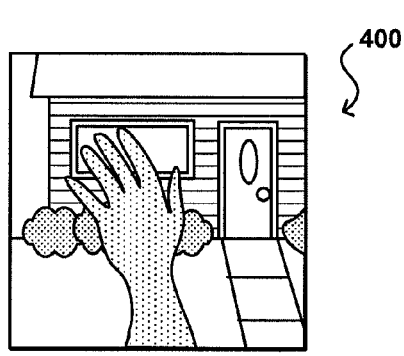
FIGS. 4(a) and (b) illustrate example images resulting from a translation of a device between image capture times that can be analyzed in accordance with various embodiments.
Figure 4B:
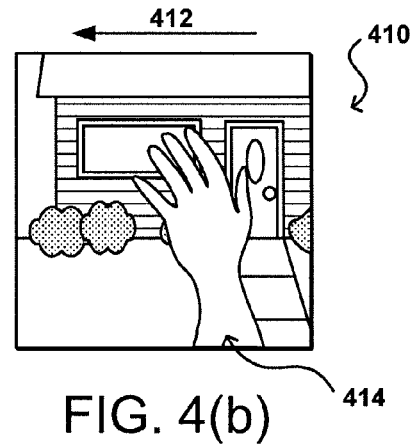

As would be apparent to one of ordinary skill in the art in light of the present disclosure, the motion of a camera or other such imaging element can include both a translation and a rotation component, in one, two, or three dimensions. As illustrated in FIG. 3(d), small rotations of a camera can potentially result in significant movement of objects in the captured images. The amount of movement can depend upon the angular capture range, or viewable angle, of the camera, as well as the speed of the rotation. Because all objects in the image will move by the same angular amount, the background moves with the objects in the foreground in the image information. It should be noted, however, that translation tends not to affect the background to the same extent between images. For example, FIG. 4(a) illustrates a first image 400 captured at a first position and FIG. 4(b) illustrates a second image 410 captured at a second position, resulting from a lateral translation as indicated by the directional arrow 412. Due at least in part to the distance to the background objects, which for small consumer optical components can be considered to be almost at infinity for calculation purposes, there will be very little lateral shift in position of the background objects between pictures. Objects in the foreground, such as the user's hand 414, however, can move by a more appreciable amount. Thus, comparing the images 400, 410 can still provide adequate separation of the background (e.g., by image subtraction) as the small change in lateral position of the background will still enable the background to be substantially removed during the comparison process.

Accordingly, approaches in accordance with various embodiments focus primarily on rotations of the phone when accounting for device movements between image captures. In other embodiments as discussed, however, at least some embodiments can also account for at least some amount of translation when present.

Figure 5A:
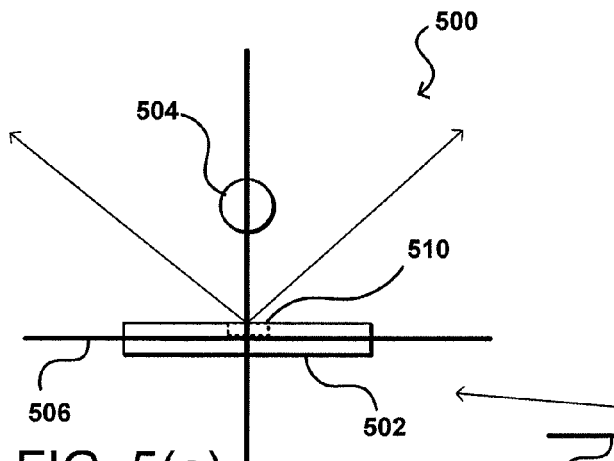
FIGS. 5(a), (b), and (c) illustrate an example situation wherein the rotation of a device can be tracked and used to align images based at least in part upon the rotation in accordance with various embodiments.

For example, FIG. 5(a) illustrates a "top view" 500 of a computing device 502 operable to capture an image of an object 504 within an angular view 508 of a camera of the computing device. In this example, the computing device 502 can include at least one orientation- or rotation-determining element, such as an electronic compass or electronic gyroscope, that is able to determine a frame of reference 506 in two or three dimensions with respect to a first orientation of the device. In at least some embodiments, an electronic compass might be used to determine an axis of the frame of reference 506, as may correspond to a North direction, etc. In other embodiments, a component such as an electronic gyroscope might be calibrated periodically with a component such as a compass, but might instead determine a changes in orientation along three axes of rotation over time. Various other approaches to determining changes in orientation along one, two, or three axes of rotation can be used as well within the scope of the various embodiments.

A first frame of reference 506 or orientation can be determined at or near the time of capture of a first image by a camera 510 of the computing device 502. In some embodiments, the determination can be triggered by receiving input to capture an image or another such action, but in other embodiments the frame of reference and/or orientation information can be updated periodically, such as several times a second based upon the type and/or configuration of the electronic gyroscope. The gyroscope can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein.

Figure 5B:
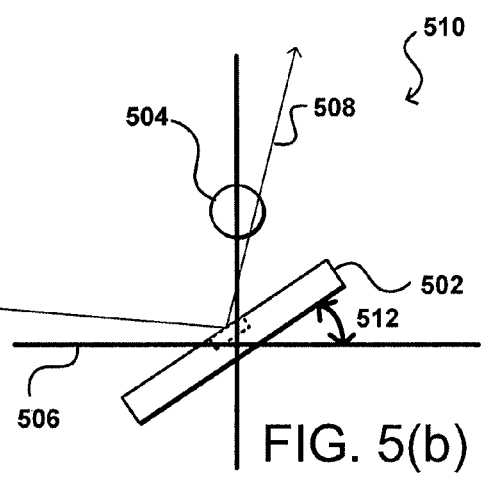

FIG. 5(b) illustrates a second top view 510 after a change in orientation of the computing device 502. The electronic gyroscope (or other such component or embedded sensor) can detect the change in orientation, in this example corresponding to a change in angle 512 with respect to the frame of reference in the plane of the figure. The gyroscope can present information about the change in orientation in any appropriate form, such as in angles or radians of change for one, two, or three degrees (e.g., Δx, Δy, Δz), percentage changes in pitch, roll, and yaw, etc. In this example, the change in orientation is determined to be a given angular amount of rotation 512 about a single axis. As illustrated, this causes the object 504 to be moved to the right edge of the field of view 508 of the camera 510. In at least some embodiments, the gyroscope will not be accurate enough to provide an exact amount of rotation, but can provide an approximation or estimate of the amount of rotation that can be used to narrow the search space and facilitate the location of corresponding objects in the images.

As mentioned above, the amount of angular motion can be utilized with information about the angular capture range of the camera to determine or predict how much lateral offset will be experienced between the images. For example, the angular capture range or field of view 508 of the camera 510 in FIG. 5(*b*) might be 120 degrees, and the angular rotation amount might be 40 degrees. Since the angular movement is about one third of the total angular view, the objects will likely move laterally, according to the direction of the rotation, about one third of the width of each image between successive images (although this is an approximation and can vary depending upon aspects of the optics, etc.). Based at least in part upon the amount of lateral movement, the images taken at those times can be aligned such that corresponding objects in those images will overlap. For example, FIG. 5(*c*) illustrates an example overlay 520 of a first image 522 captured at a first orientation of the computing device and a second image 524 captured at a second orientation of the computing device. Once an amount of lateral shift in object location between the images is determined, that amount of lateral shift or offset 528 can be used to align the images 522, 524 such that objects 530 in the background will substantially align as well. As discussed elsewhere herein, the images do not have to be aligned by modifying at least one of the images to adjust for object shift, but image information such as color and intensity data can be mapped from one of the images to the appropriate positions of the corresponding image information in the other image, enabling a pixel-by-pixel or position-by-position comparison. Once the background objects are aligned, a comparison or subtraction process can be used to remove the background such that one or more objects 526 in the foreground can be more easily detected, as discussed elsewhere herein.

Figure 5C:
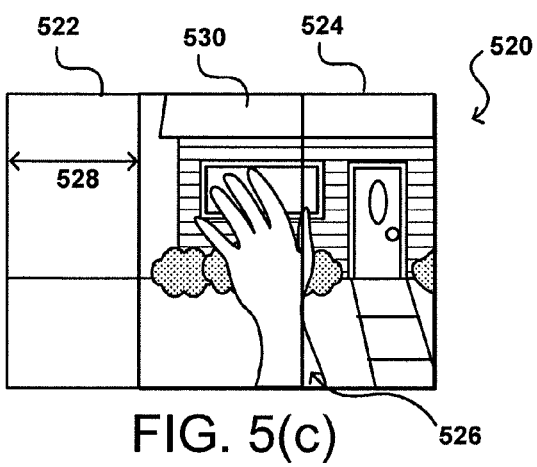

As mentioned, a combined or aligned image such as that illustrated in FIG. 5(*c*) does not need to be generated in at least some embodiments. For example, pixel values can be offset by an appropriate amount, such as by shifting pixel values by a determined amount for the change in position, and then comparing the individual values to remove background objects, static portions of the image, etc. Various other comparison approaches can be used as well within the scope of the various embodiments.

Figure 6:
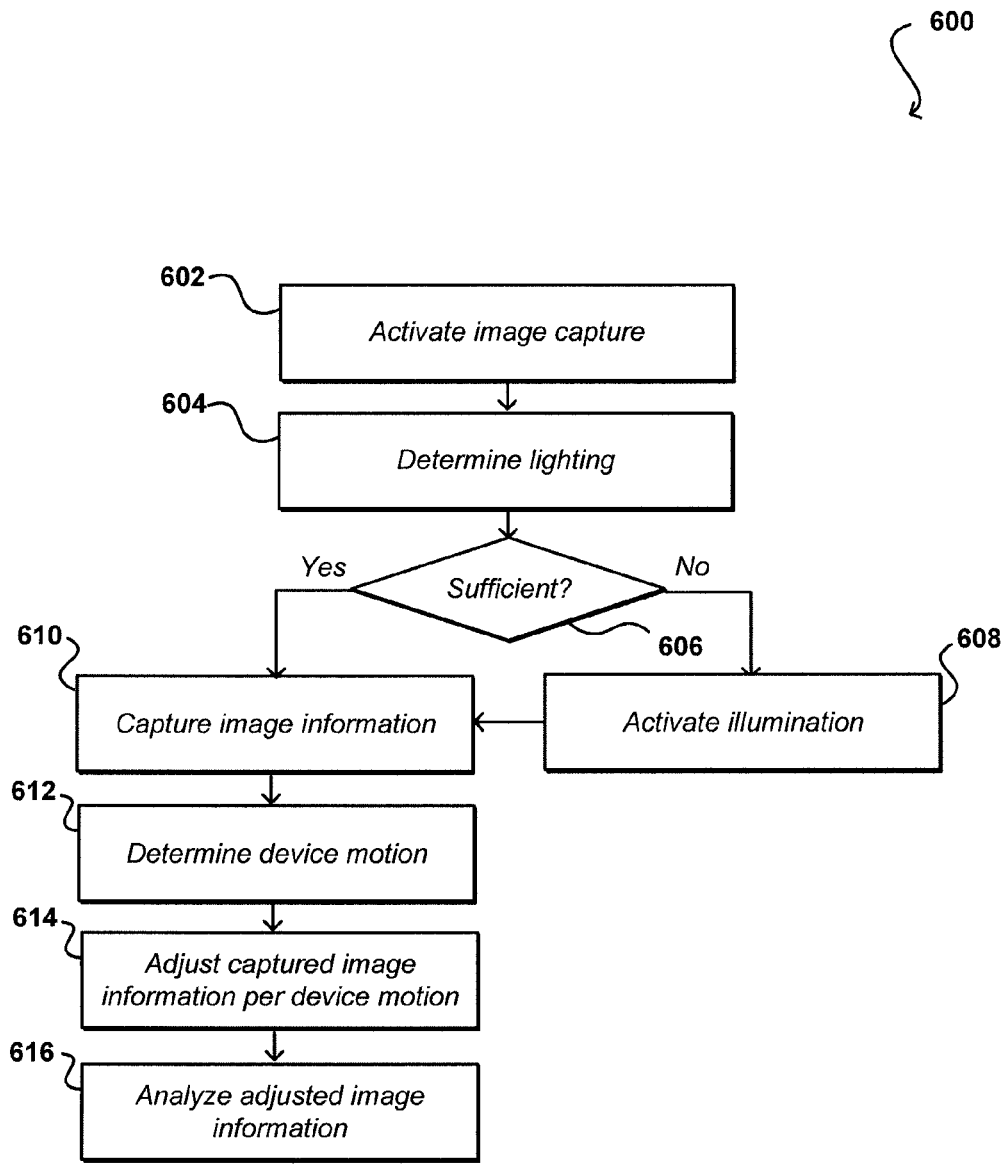
FIG. 6 illustrates an example process for monitoring device motions and using those motions to adjust captured images for analysis in accordance with various embodiments

FIG. 6 illustrates an example process 600 for capturing and analyzing image information that can be used in accordance with various embodiments. It should be understood that, for any process discussed herein, there can be additional, fewer, or alternative steps performed in similar or alternative orders, or in parallel, within the scope of the various embodiments unless otherwise stated. In this example, image capture is activated 602 on a computing device. The image capture can be activated in response to any appropriate action, such as a user opening an application or selecting an option, a user performing a gesture or providing other such input, and the like. In other embodiments, image capture might be activated automatically, such as upon activation of the computing device. Image capture can also be used for any appropriate purpose, such as for gesture or motion input, to identify objects near the device, for facial recognition, and other such purposes.

In this example, the computing device can determine 604 information about the lighting at or near the device, such as an amount of ambient light in a region to be imaged by a camera or other imaging element of the device. In some embodiments a light sensor or other such component can be used, while in other embodiments the cameras or other image capture elements can be used to determine lighting information. A determination can be made 606 as to whether the determined lighting is sufficient for image capture, at least for the particular purpose for the image capture. For example, facial recognition might require a certain amount of ambient light, else an illumination element (e.g., a white light LED) might be used to illuminate one or more objects in the capture range of the computing device. Similarly, if infrared (IR) light is to be used to perform gesture detection, a determination might be made that an IR emitter or other such source should be activated on the device. If necessary or appropriate, at least one light source on the computing device can be activated 608 for image capture. As discussed, in some embodiments illumination then can be used alternatively between successive image captures in order to help separate objects in the foreground from images in the background, as images in the foreground can be more affected by the illumination.

At one or more appropriate times, image information can be captured 610 by one or more cameras or other imaging elements of the computing device. At the same time, during the same period, concurrently, or at any other appropriate time(s), device motion and/or orientation can be determined 612 and/or tracked, such as by using one or more motion, orientation, or rotation determining components as discussed elsewhere herein. As mentioned, the motion determination might occur at times, or with frequencies or duty cycles, that differ from the times or frequencies of image capture, such that interpolation or another such process might need to be used to determine an approximate orientation of the computing device when a particular image was captured. For any two images captured within a given period of time or at a current locations, for example, the computing device (or a system or service in communication with the computing device) will determine the change in orientation of the computing device (and thus the one or more cameras) between the capture times of those images. Once the change in orientation of the device is determined, that information can be used to determine an amount and/or direction of shift of one or more objects between the images. Information for at least one of the captured images then can be adjusted 614 such that the position of one or more objects in a first captured image approximately corresponds to the position of the one or more objects in the second captured image based at least in part upon the determined positional shift. The adjusted image information then can be analyzed and/or processed 616, such as to subtract out background or static objects and perform at least one type of analysis on any identified foreground object as discussed elsewhere herein.

Such an approach can work in bright or dark conditions. As mentioned, a light sensor can be used in at least some embodiments to determine when illumination is needed due at least in part to lighting concerns. In other embodiments, a device might look at factors such as the amount of time needed to process images under current conditions to determine when to pulse or strobe the LED. In still other embodiments, the device might utilize the pulsed lighting when there is at least a minimum amount of charge remaining on the battery, after which the LED might not fire unless directed by the user or an application, etc. In some embodiments, the amount of power needed to illuminate and capture information using the gesture sensor with a short detection time can be less than the amount of power needed to capture an ambient light image with a rolling shutter camera without illumination.

As discussed, such an approach can be used to help identify motions or gestures made by a user and captured in the image information. For example, a user can make an appropriate motion or gesture within a capture range of at least one image capture element of an electronic device. The information captured by the image capture element can be analyzed to determine a location of at least one specific feature in each frame or other segment of information, in order to track the position of each feature over time. The feature position can be determined, for example, through image analysis of a camera-captured image or intensity analysis of reflected IR radiation in a sensor-captured image. Various other imaging approaches can be used as well. The captured image information can be analyzed to determine a period over which a detected motion might correspond to a gesture or other such input. In many embodiments, it may be too resource intensive to analyze every frame of captured video or image information, unless the device is in a low frame rate or other such mode. In some embodiments, the device will periodically analyze captured image information to attempt to determine whether a feature in the image information appears to indicate a user making a motion or gesture. In at least some embodiments, this can cause the device to begin to capture information with a higher frame rate or frequency, during which time a gesture or input analysis algorithm can be used to analyze the information. In other embodiments, the device might utilize a rolling buffer of image information, keeping image information from a recent period, such as the last ten seconds. When a possible gesture or user motion is detected, the device might also analyze the information in the buffer in case the device missed the beginning of a motion or gesture at the time of motion detection. Various other approaches can be used as well as should be apparent in light of the teachings and suggestions contained herein.

In another context, a device might capture image information in an attempt to identify a current user of the device, such as through facial recognition, heat signatures, eye recognition, and other such approaches. A device might also capture information to help identify others near the device, such as to identify people in a meeting. A device might also be used to capture images of products or other objects that the user wants to identify, or otherwise use to obtain information. For example, a user might see an object in any particular location and want to determine whether the user can purchase that item from one or more potential sources. The user might take at least one picture of that object to be analyzed by the computing device or otherwise provided to a remote system or service for analysis. Approaches discussed herein can help to separate that object from other objects or portions of the captured image(s), such that the analysis can be less intensive and/or less information can be uploaded for analysis. Various other uses and advantages can be provided as well within the scope of the various embodiments.

As discussed, at least some approximations can rely upon the fact that translation affects background motion much less than rotation to assume that the axis of rotation passes through a center point of the camera capturing the image. In order to reconstruct a true optical flow using a component such as a gyroscope, however, it can be at least beneficial to also determine the location of the axes of rotation, in addition to the degree and/or speed of the rotation. If a device such as a smart phone is rotated by the user's wrist, then the approximation can be relatively accurate. In at least some embodiments, translation measurements or data from an accelerometer or similar component can be used to attempt to determine the axes of rotation, in order to provide a more accurate determination of object shift between images. Methods for determining an axis of rotation given a translation and a rotation are well known in the field of mathematics and will not be discussed herein in detail.

In at least some embodiments the gyroscope signal can be sampled much faster than the video or image capture frame rate. In some embodiments, an element such as a Kalman filter can be used to synchronize, extrapolate, and subtract the predicted rotational signal from the optical flow between successive frames. Such an approach can utilize control over different levels of operating system software, as well as hardware components, to minimize delays and predict changes in synchronization with high accuracy.

In at least some embodiments, a component such as an electronic gyroscope can provide a velocity of rotation about three axes. When the velocity is compared against the amount of elapsed time, an amount of rotation can be determined. Thus, in at least some embodiments each gyroscope reading has an associated timestamp. With a relatively high frequency of determination, a rotation angle for a period of time can be determined with relative accuracy. The rotation angle can be thought of as the optical flow, which as illustrated does not depend largely on distance to a particular object as everything is expressed in degrees of rotation. Knowing the field of view of the camera enables conversion between pixels and degrees (i.e., a camera of 100 pixels with a 50 degree field of view will have a 0.5 degree per pixel value).

Figure 7:
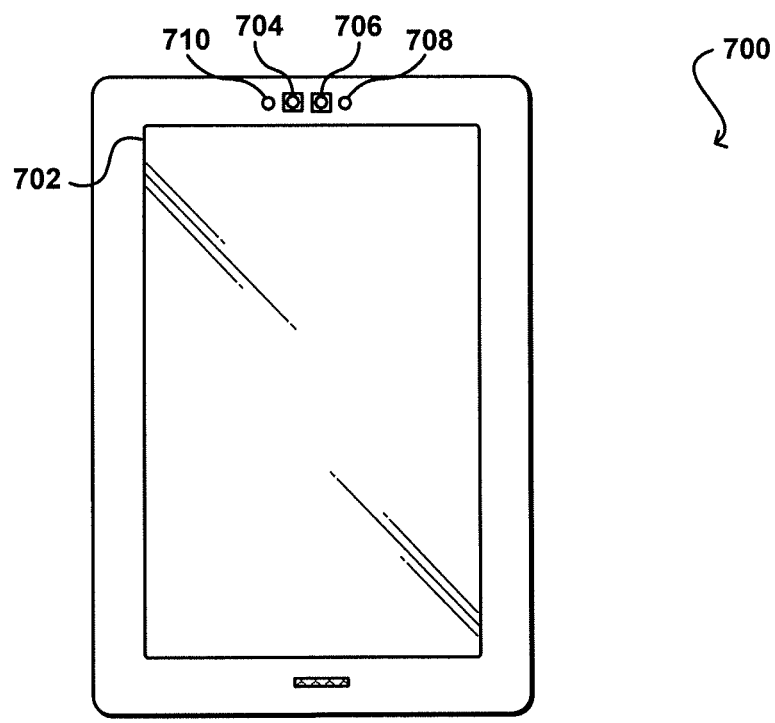
FIG. 7 illustrates an example computing device that can be used in accordance with various embodiments.

FIG. 7 illustrates an example computing device 700 that can be used to perform approaches described in accordance with various embodiments. In this example, the device has a conventional digital camera 704 on a same side of the device as a display element 702, enabling the device to capture image information about a user of the device during typical operation where the user is at least partially in front of the display element. In addition, there is an infrared (IR) sensor 706 (or transceiver, etc.) positioned on the same side of the device that can be used to determine gesture input from the user when at relatively the same location. Such a configuration is useful when ambient light image information is subtracted from IR image information, but it should be understood that there can be additional or fewer cameras, sensors, or other such elements on the same or other sides or locations of the device as well within the scope of the various embodiments, such as may enable gesture or image input from any desired direction or location with respect to the device.

In this example, a light sensor 708 is included that can be used to determine an amount of light in a general direction of an image to be captured and at least one illumination element 710, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. Various other elements and combinations of elements can be used as well within the scope of the various embodiments as should be apparent in light of the teachings and suggestions contained herein.

Figure 8:
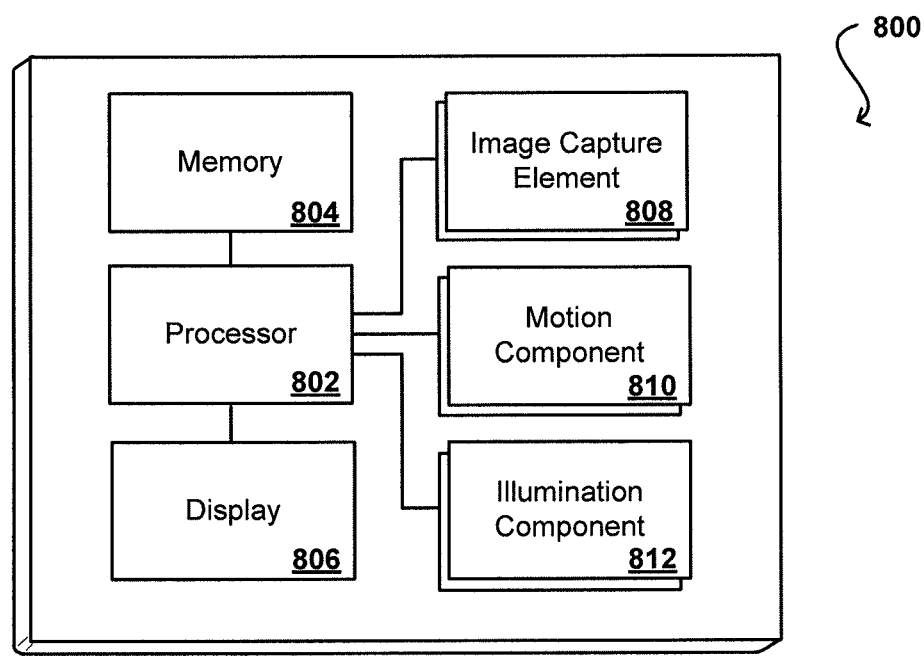
FIG. 8 illustrates an example configuration of components of a computing device such as that illustrated in FIG. 7.

In order to provide various functionality described herein, FIG. 8 illustrates an example set of basic components of a computing device 800, such as the device 700 described with respect to FIG. 7. In this example, the device includes at least one central processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 808, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can also include at least one dedicated gesture component, such as an IR sensor or detector, operable to capture information for use in determining gestures or motions of the user, which will enable the user to provide input through the portable device without having to actually contact and/or move the portable device. The device can include at least one motion component 810, such as an accelerometer or inertial sensor to measure translation, an electronic compass to calibrate direction in up to three dimensions, an electronic gyroscope to determine and/or track changes in orientation, and other such elements. The device also can include at least one illumination element 812, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 9:
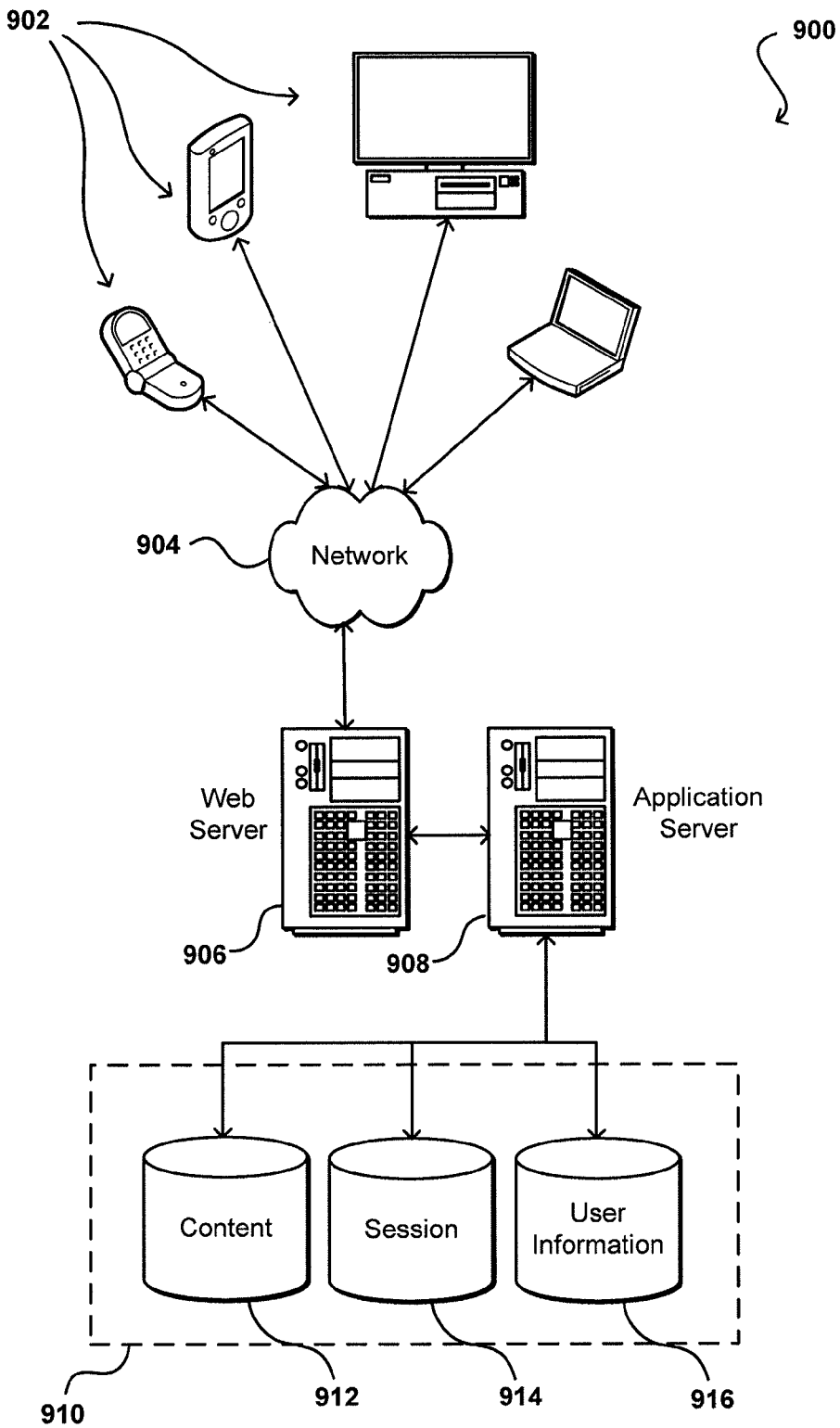
FIG. 9 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, hand-held messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of tracking motion of a target object via a computing device, comprising:
  tracking a respective orientation of the computing device over at least a period of time using at least one embedded sensor of the computing device;

capturing a first image using a camera of the computing device at a first time, the first image including a representation of the target object and a respective representation of one or more background elements;

capturing a second image using the camera of the computing device at a second time, the second image including the representation of the target object and the respective representation of the one or more background elements;

calculating, an angular change in orientation of the computing device between the first time and the second time using the respective orientation tracked by the at least one embedded sensor between the first time and the second time;

calculating, a first number of pixels corresponding to a first shift of the respective representation of the one or more background elements in the second image with respect to the respective representation of the one or more background elements in the first image based at least in part upon the angular change in orientation;

calculating a second number of pixels corresponding to a second shift of the respective representation of the one or more background elements in the first image with respect to the respective representation of the one or more background elements in the second image based at least in part upon the angular change in orientation;

generating a third image by a first shifting of second intensity and color values of the second image by the first number of pixels to align the respective representation of the one or more background elements in the first image and the third image;

generating a fourth image by a second shifting of first intensity and color values of the first image by the second number of pixels to align the respective representation of the one or more background elements in the second image and the fourth image;

substantially removing the respective representation of the one or more background elements from: (a) the first image by subtracting third intensity and color values of the third image from the first intensity and color values of the first image and (b) the second image by subtracting fourth intensity and color values of the fourth image from the second intensity and color values of the second image; and determining the motion of the target object based on the first image and the second image each with the respective representation of the one or more background elements substantially removed.

2. The method of claim 1, wherein calculating the angular change in orientation of the computing device between the first time and the second time includes:

receiving angular velocity and timestamp information from the at least one embedded sensor; and calculating an angular change for at least one axis of rotation.

3. The method of claim 2, wherein the timestamp information does not match the first time and the second time, and the method further comprises:

interpolating respective orientation information for the first time and the second time using the respective orientation tracked for timestamps adjacent to the first time and the second time.

4. The method of claim 1, wherein an amount of the first shift is calculated in part using an angular field of view and a number of pixels of the camera.

5. The method of claim 1, further comprising:

illuminating the target object using at least one illumination element of the computing device while capturing one of the first image or the second image.

6. The method of claim 1, wherein the at least one embedded sensor includes at least one of an accelerometer, an electronic gyroscope, an electronic compass, or an inertial sensor.

7. A computer-implemented method of providing input to an electronic device, comprising:

obtaining a first image and a second image each including a representation of an object and a respective representation of one or more background elements using a camera of the electronic device, the first image being captured at a first time and the second image being captured at a second time;

determining, using information generated by at least one embedded sensor of the electronic device, at least a rotational change in orientation of the electronic device between the first time and the second time;

estimating a first amount of image shift of the second image relative to the first image and a second amount of image shift of the first image relative to the second image due at least in part to the rotational change;

substantially removing the respective representation of the one or more background elements from: (a) the first image using a first mapping of respective image information of the first image and the second image and (b) the second image using a second mapping of the respective information of the first image and the second image, the first mapping being based at least in part upon the first amount of image shift, and the second mapping being based at least in part upon the second amount of image shift; and determining motion of the object based on the first image and the second image each with the respective representation of the one or more background elements substantially removed.

8. The computer-implemented method of claim 7, wherein substantially removing the respective representation of the one or more background elements from the first image and the second image includes:

generating a third image by a first shifting of second intensity and color values of the second image by the first amount of image shift to align the respective representation of the one or more background elements in the first image and the third image;

generating a fourth image by a second shifting of first intensity and color values of the first image by the second amount of image shift to align the respective representation of the one or more background elements in the second image and the fourth image; and subtracting: (a) third intensity and color values of the third image from the first intensity and color values of the first image and (b) fourth intensity and color values of the fourth image from the second intensity and color values of the second image.

9. The computer-implemented method of claim 7, further comprising:

illuminating the object using at least one illumination element of the electronic device during a capture time of one of the first image or the second image such that at least a portion of the representation of the object has a change in brightness between the first image and the second image.

10. The computer-implemented method of claim 7, further comprising:
determining an amount of lateral translation of the electronic device between the first time and the second time using at least one translation sensor,
wherein at least one of the first mapping or the second mapping is further based at least in part upon the amount of lateral translation.

11. The computer-implemented method of claim 7, wherein the at least one embedded sensor includes at least one of an accelerometer, an electronic gyroscope, an electronic compass, or an inertial sensor.

12. The computer-implemented method of claim 7, wherein the camera is a still image camera and the first image and the second image are still images, or the camera is a video camera and the first image and the second image are frames of video information.

13. The computer-implemented method of claim 7, wherein the object includes at least one feature of a user, and the method further comprises:
determining at least one gesture performed by the user to provide input to the electronic device using the motion of the object.

14. The computer-implemented method of claim 7, wherein the first image and the second image include at least one of ambient light image information or reflected infrared image information.

15. The computer-implemented method of claim 7, further comprising:
deactivating image capture if no motion or gesture is detected within a specified period of inactivity.

16. A computing device, comprising:
a device processor;
a camera;
an embedded sensor; and
a memory device including instructions that, upon being executed by the processor, cause the computing device to:
obtain a first image and a second image using the camera, the first image being captured at a first time and the second image being captured at a second time, the first image and the second image each including a representation of an object and a respective representation of one or more background elements;
determine a rotational change in orientation of the computing device during a period including the first time and the second time using the embedded sensor;
estimate a first amount of image shift of the second image relative to the first image and a second amount of image shift of the first image relative to the second image based at least in part upon the rotational change;
minimize the respective representation of the one or more background elements in: (a) the first image using a first map of respective image information of the first image and the second image and (b) the second image using a second map of the respective image information of the first image and the second image, the first map being based at least in part upon the first amount of image shift, and the second map being based at least in part upon the second amount of image shift; and
determine motion of the object based on the first image and the second image each with the respective representation of each of the one or more background elements minimized.

17. The computing device of claim 16, further comprising:
at least one illumination element operable to illuminate the object during a capture time of one of the first image or the second image such that at least a portion of the object has a change in brightness between the first image and the second image.

18. The computing device of claim 16, further comprising:
a lateral sensor element operable to determine an amount of lateral translation of the computing device between the first time and the second time,
wherein at least one of the first map or the second map is further based at least in part upon the amount of lateral translation.

19. A non-transitory computer-readable storage medium storing instructions that, upon being executed by a processor, cause the processor to:
obtain a first image and a second image each including a representation of an object and a respective representation of one or more background elements using a camera of an electronic device, the first image being captured at a first time and the second image being captured at a second time;
determine, using information generated by at least one embedded sensor, at least a rotational change in orientation of the electronic device between the first time and the second time;
estimate a first amount of image shift of the second image relative to the first image and a second amount of image shift of the first image relative to the second image based at least in part upon the rotational change in orientation;
substantially remove the respective representation of the one or more background elements in: (a) the first image using a first mapping of respective image data of the first image and the second image and (b) the second image using a second mapping of the respective information of the first image and the second image, the first mapping being based at least in part upon the first amount of image shift, and the second mapping being based at least in part upon the second amount of image shift; and
determine motion of the object based on the first image and the second image each with the respective representation of the one or more background elements substantially removed.

20. The non-transitory computer-readable storage medium of claim 19, wherein the instructions upon being executed to cause the processor to determine the rotational change in orientation of the electronic device between the first time and the second time include causing the processor to:
receive angular velocity and timestamp information from the at least one embedded sensor; and
calculate an angular change for at least one axis of rotation.

21. The non-transitory computer-readable storage medium of claim 20, wherein the timestamp information does not match the first time and the second time, and the instructions, upon being executed, further cause the processor to:
interpolate respective orientation information for the first time and the second time using the rotational change in orientation for timestamps adjacent to the first time and the second time.

* * * * *